US012601208B2

(12) United States Patent
Pipher et al.

(10) Patent No.: US 12,601,208 B2
(45) Date of Patent: Apr. 14, 2026

(54) CONTAINER ACCESS CONTROL

(71) Applicants: David Pipher, Tillsonburg (CA); Darren Olson, North York (CA)

(72) Inventors: David Pipher, Tillsonburg (CA); Darren Olson, North York (CA)

( * ) Notice: Subject to any disclaimer, the term of this patent is extended or adjusted under 35 U.S.C. 154(b) by 84 days.

(21) Appl. No.: 18/743,416

(22) Filed: Jun. 14, 2024

(65) Prior Publication Data

US 2025/0382832 A1 Dec. 18, 2025

(51) Int. Cl.

| | |
|---|---|
| ***E05B 83/10*** | (2014.01) |
| ***E05B 13/00*** | (2006.01) |
| ***E05B 65/00*** | (2006.01) |
| ***E05B 65/48*** | (2006.01) |
| *E05B 7/00* | (2006.01) |

(52) U.S. Cl.

CPC ............ *E05B 83/10* (2013.01); *E05B 13/001* (2013.01); *E05B 65/0021* (2013.01); *E05B 65/48* (2013.01); *E05B 7/00* (2013.01)

(58) Field of Classification Search

CPC ........ E05B 7/00; E05B 13/001; E05B 13/002; E05B 13/008; E05B 65/0003; E05B 65/0021; E05B 65/02; E05B 65/06; E05B 65/48; E05B 65/52; E05B 83/02; E05B 83/08; E05B 83/10

See application file for complete search history.

(56) References Cited

U.S. PATENT DOCUMENTS

| | | | | | |
|---|---|---|---|---|---|
| 4,033,156 | A * | 7/1977 | Cottingham | E05B 17/002 | 174/67 |
| 5,168,258 | A * | 12/1992 | Radke | E05B 67/38 | 70/DIG. 49 |
| 5,560,235 | A * | 10/1996 | Aucoin | E05B 13/001 | 70/168 |
| 6,010,166 | A * | 1/2000 | Hamilton | E05B 13/002 | 70/56 |
| 8,935,944 | B2 * | 1/2015 | Boesel | E05B 65/48 | 70/2 |
| 9,032,765 | B2 * | 5/2015 | Boesel | E05B 83/10 | 70/2 |
| 9,562,374 | B1 * | 2/2017 | Haber | E05B 83/10 | |
| 10,954,699 | B2 * | 3/2021 | Pare | E05B 83/10 | |

(Continued)

*Primary Examiner* — Christopher J Boswell

(57) ABSTRACT

A security box for securing access to shipping containers and tractor trailers is provided. The security box comprises two halves that are attached by a hinge and that can be closed together. When the security box is in the closed position, it has the general shape of a closed box with openings at the sides. The openings are sized so as to accommodate a handle which rotates a lockrod assembly securing a container door. The security box can be locked by rotating a shaft protruding from within the box and then engaging an electromechanical lock. Rotation of the shaft rotates a flange attached to the end of the shaft so that it rotates behind two fixed flanges which block the rotatable flange from moving outward, and hence the box from opening. In this way, the handle is secured within the box and prevented from being rotated away from the container door, which in turn prevents the lockrod assembly from being rotated and the container door from being opened. The electromechanical lock is operated solely by proximity of a device with a digital key, allowing access to the container to be better controlled and logged.

8 Claims, 3 Drawing Sheets

(56) References Cited

U.S. PATENT DOCUMENTS

| | | | | |
|---|---|---|---|---|
| 11,551,498 | B2 * | 1/2023 | Hage | E05B 83/10 |
| 2015/0108772 | A1 * | 4/2015 | Boesel | E05B 67/383 |
| | | | | 292/307 R |

* cited by examiner

CONTAINER ACCESS CONTROL

FIELD OF INVENTION

This invention relates to containers used to transport or store goods, and more particularly to secure control of access to such containers.

BACKGROUND

Theft from shipping containers, tractor trailers, intermodals, and other containers used to store or ship and move goods (collectively referred to herein as "containers") is a problem and is on the rise. Such theft costs hundreds of millions of dollars and affects product supply, consumer costs, and insurance rates in an industry that is still suffering from the impacts of Covid.

Many of these containers are accessed by opening two doors at the back of the container. Lockrod assemblies run vertically from the top of the container to the bottom of the container the height of the doors, typically one or two lockrod assemblies per door. Each lockrod assembly comprises a vertical rod which has cams at each end that are configured to interact with keepers fixed to the top and bottom of the container. When the rods are rotated axially, the knuckles are either engaged with the keepers to prevent opening of the doors, or disengaged from the keepers to allow the doors to be opened, depending on the rotational position of the rods. Each rod is rotated by means of a respective handle, which is rotated away from or towards the doors.

Seal plates and seal pins are attached to the doors allow the handles to be locked in position. For each handle there is one set of a seal plate and a seal pin. The seal plate is fixed in place and the seal pin can rotate across the surface of the door. In the majority of cases the doors are not locked, but each set of a seal plate and a seal pin has holes through which a lock can be placed. When locked, the seal pin cannot be rotated and the handle is prevented from being rotated away from the container doors, thereby preventing the lockrod assembly to which it attached from rotating and disengaging the cams from the keepers, which prevents the doors to the container from being openable. When locks are applied, they tend to be padlocks with keys or codes. The use of keyed padlocks leads to several problems, such as where to keep the keys, how to issue them, and how to recover them, especially when it comes to containers that are shipped across countries and continents. The use of codes also presents problems, as the code for the lock is not secure and it can easily be shared with others.

Another problem with padlocks, whether they use physical keys or codes, is caused by vibration of the lock. Vehicles in motion create vibration and movement, and padlocks can fail under these conditions.

Physical keys and codes also do not provide a data log, showing when and by whom the container was opened or locked.

Another solution is the use of security seals on the doors, and many shippers use these. A security seal is passed through the holes in the seal pins and seal plates preventing a handle from being rotated away from the door. The doors of the container cannot be opened without breaking the security seal, and a broken seal indicates that the container has been accessed. In Canada there is a voluntary program called, "Partners in Protection" or PIP for short. This program is a partnership between CBSA, shippers and receivers to protect cargo. The seal requirements are for all modes of cargo shipment including truck, intermodal, rail, air and sea. There is a similar program in the U.S. Security seals that are part of these programs expedite access when crossing Canadian, American and Mexican borders.

Although the use of security seals can facilitate cross border transport of good and provides a log of access to the container, security seals can be copied using 3D printers to make it appear as though a container and its contents have not been tampered with.

A tamperproof means of securing containers that is not vulnerable to physical vibrations and that does not use physical keys or sharable codes would reduce container theft and facilitate cross border transport of goods. Such means of securing the containers would also preferably allow easy logging of access to the container.

SUMMARY

According to one embodiment of the invention, a security box for securing a container is provided. The security box has a back portion having sidewalls with openings, a back wall, and at least one blocking flange, the back portion generally shaped as a box open on one face opposite the back wall. The security box also has a front portion having a front wall, a shaft passing through the front wall, and sidewalls with openings, the front portion generally shaped as a box open on one face opposite the front wall. A hinge connects the back wall of the back portion to the front wall of the front portion. The openings in the sidewalls of the back portion and the openings in the sidewalls of the front portion are positioned such that when the front portion is swung about the hinge towards the back portion to place the security box in a closed configuration, a generally closed box is formed but with openings at the sides. The openings are sized to accommodate a handle of a lockrod assembly of a container door. The front portion contains a lock which prevents the shaft from rotating when in a locked configuration. A blockable member is attached to the shaft and which is rotatable parallel to the front wall of the front portion, and rotatable so as to be placed between the at least one blocking flange and the back wall when the shaft is rotated and the security box is in the closed configuration.

According to another embodiment of the invention, a method of controlling access to a container is provided. The container is accessed by unlocking and opening a security box affixed to a door of the container, the security box being as defined in the preceding paragraph, and a handle of a lockrod assembly of the door of the container is removed from the openings of the security box by pulling the handle away from the container door. The container is closed and secured by closing the door of the container, rotating the handle towards the door of the container so as to place the handle so as to lie within the openings of the back portion of the security box, closing and locking the security box while the handle is lying within the openings.

By using a steel box with openings on the sides and which can be opened only with use of a digital key operating an electromechanical lock, the doors to a container on a transport truck or a shipping container can be better secured. By sizing the openings so as to accommodate a handle used to rotate a lockrod assembly used to keep a door of the container closed, the box can be opened, the handle rotated into the openings, and the box closed and locked. This secures the handle so that it cannot be rotated away from the door, and thereby the door of the container is secured shut.

The requirement of a digital key to open the box and release the handle also means that access to the container can be tracked and logged.

BRIEF DESCRIPTION OF THE DRAWINGS

The features and advantages of embodiments of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
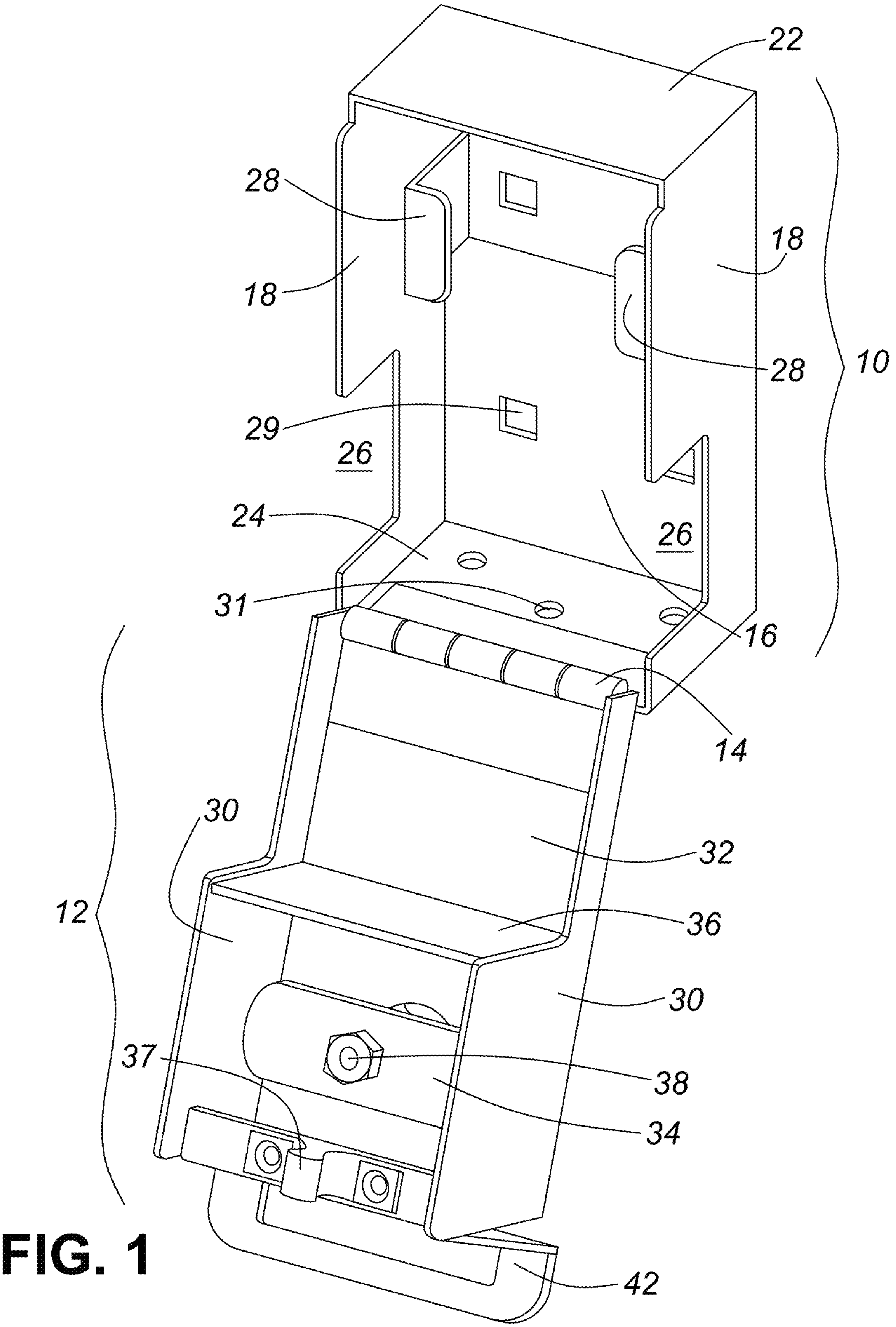
FIG. 1 shows a security box in an open configuration according to one embodiment of the invention.

Referring to FIG. 1, a security box is shown according to one embodiment of the invention. The security box comprises a back portion 10. The back portion 10 comprises a back wall 16, two side walls 18, a top wall 22, and a bottom wall 24. The side walls 18 each have an opening 26 on the edge away from the back wall 16 and aligned with each other. The back portion 10 also includes two blocking flanges 28 between the openings 26 and the top wall 22. Each blocking flange 28 is adjacent a respective one of the side walls 18. The blocking flanges 28 are generally L-shaped, with one leg of each L parallel to one of the sidewalls 18 and the other leg of the L-shape parallel to and spaced away from the back wall 16. The legs of the blocking flanges which are parallel to the back wall each point away from their respective side wall toward the middle of the back portion 10. The back portion 10 is open at a face opposite the back wall 16, and is generally shaped as an open-faced box.

The back wall 16 preferably has at least two bolt apertures 29. The purpose of the at least two bolt apertures 29 is to accommodate carriage bolts which can be used to fasten the security box to a door of a container.

The bottom wall 24 preferably has at least one drainage hole 31 for allowing water to drain out of the security box.

The security box also comprises a front portion 12. The front portion 12 is connected to the back portion 10 by a hinge 14 located away from the back wall 16 along the bottom wall 24 such that the security box can be closed by swinging the front portion 12 towards the back portion 10. The front portion has a front wall 32 and two side walls 30. Each side wall 30 has an opening close to the hinge 14. The front portion 12 is open at a face opposite the front wall 32, and is generally shaped as an open-faced box.

The openings in the side walls 30 are positioned such that when the security box is in a closed configuration, the openings 26 are not blocked by the side walls 30 of the front portion, yet the top wall 22, the bottom wall 24, the back wall 16, the front wall 32, and the rest of the side walls 18 provide a generally closed interior with openings to the side.

The front portion 12 also comprises an elongated wing 34 mounted on a rotatable shaft 38, the shaft being perpendicular to the front wall and the wing 34 being generally flat and parallel to the front wall. The wing 34 is preferably mounted to the shaft 38 at the center point of the wing 34. The wing 34 is fixed to the shaft 38 and can only be rotated when the shaft 38 is rotated. The wing 34 is perpendicular to the axis of the shaft 38, which in turn is perpendicular to the front wall 32, and when the shaft 38 is rotated the wing 34 is rotated in a plane parallel to the front wall 32. The shaft 38 and the wing 34 are located such that when the shaft 38 is rotated so as to position the elongated wing 34 generally parallel to the top wall 22, the blocking flanges 28 are aligned with ends of the wing 34.

The security box can be placed in a closed configuration by rotating the shaft 38 so that the wing 34 is parallel to the side walls 30 and swinging the front portion 12 towards the back portion 10. When the wing 34 is in this orientation, it is not blocked by the blocking flanges 28. The shaft 38 is of a length such that if the front portion 12 is swung far enough towards the back portion 10, the wing 34 lies closer to the back wall 16 than the legs of the blocking flanges 28 that are parallel to the back wall 16. If the shaft 38 is then rotated sufficiently, the wing 34 is rotated sufficiently that the ends of the wing are blocked by the blocking flanges 28, and the security box cannot be opened. The security box is thereby placed in a closed and locked configuration.

The front portion 12 also comprises a blocking wall 36 extending from one front portion side wall 30 to the other front portion side wall 30, and from the front portion front wall 32 to the edge of the side walls away from the front wall 32. The blocking wall 36 is positioned along the front wall 32 far enough from the hinge 14 so as not to block the openings 26 when the security box is in the closed position. The blocking wall 36 prevents access to the shaft 38 and the wing 34 when the security box is in a closed configuration.

Figure 2:
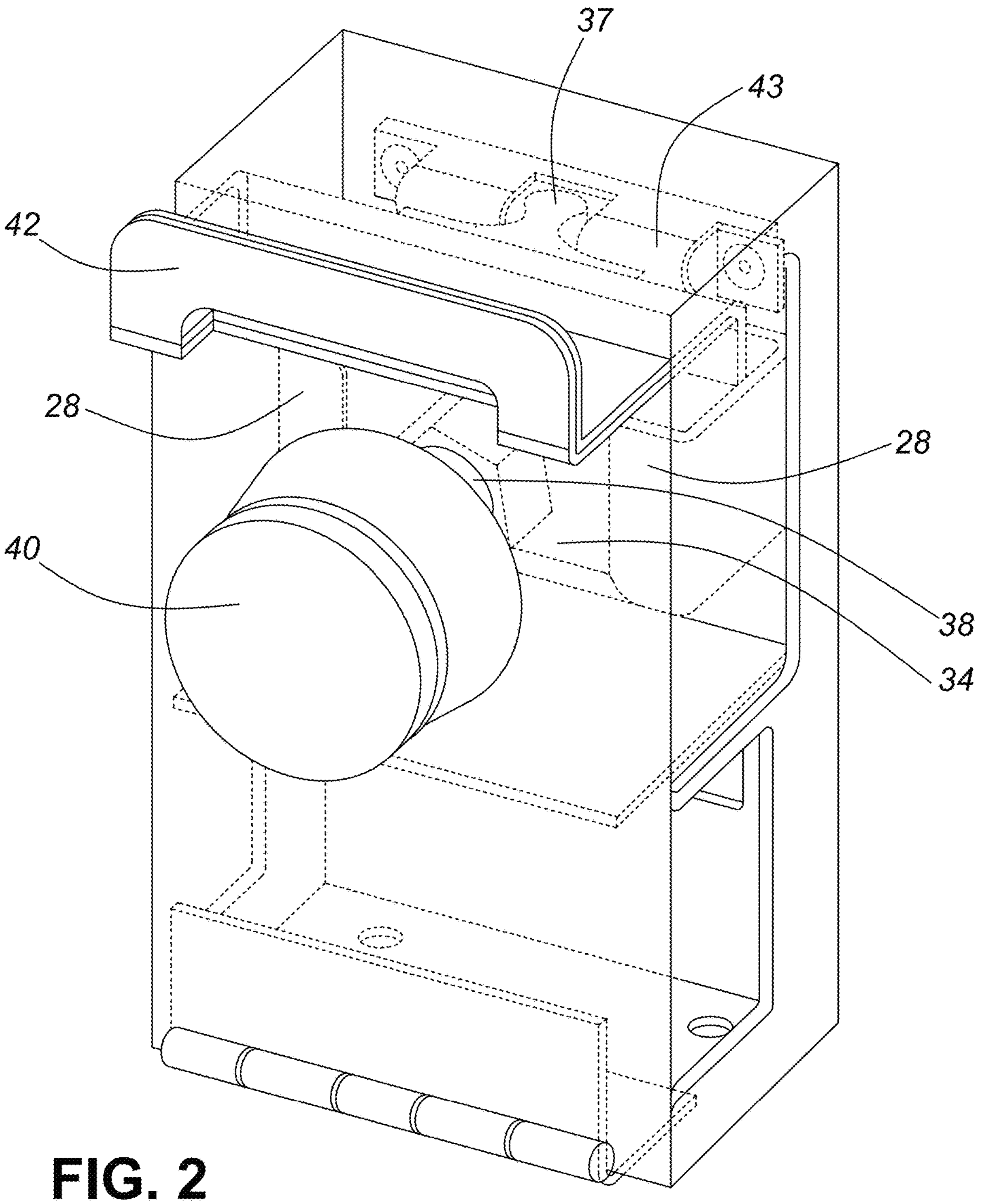
FIG. 2 shows the security box of FIG. 1 in a closed and locked configuration.

Referring to FIG. 2, the security box is shown in a closed and locked configuration. The security box is shown in FIG. 2 with the front wall 32, the back portion side walls 18, the front portion side walls 30, and the top wall 22 transparent, so as to better show the inner workings of the security box. The shaft 38 extends through the front portion front wall 32 to a knob 40. The front wall 32 also includes a handle 42 for ease of opening the security box when the shaft 38 is rotated so that the wing 34 is not blocked by the blocking flanges 28, although the handle 42 is merely a preferable feature and even if present can vary in shape.

The shaft 38 can only be rotated when the knob 40 is turned. The knob 40 has a locked position and an unlocked position. Locking is achieved by means of an electromechanical lock provided along the shaft 38 near where it is connected to the knob 40, such as the battery free electromechanical cam lock for the iLOQ S50™ locking system. The electromechanical lock can be locked and unlocked by means of a fob placed near the knob 40 or by a mobile phone in close proximity, on the order of meters, to the knob 40. The means by which the knob is turned will depend on the electromechanical lock used, as long as a digital key is required to operate the electromechanical lock. No power source or batteries are required for the lock. Power is brought to the lock by a cell phone's NFC, or a fob that is rechargeable. Rotation of the shaft 38 can only be effected by electronic means. In this way, the security box can only be opened or closed by the electronic means.

The front portion 12 preferably includes a nipple 37 at the end away from the hinge 14. When the security box is in the closed configuration, the nipple 37 engages with a spring clamp 43 in the back portion 10 next to the tope wall 22. The nipple 37 and the spring clamp 43 are enclosed by the walls of the security box. The nipple 37 and the spring clamp 43 hold the front portion 12 tightly in place against the back portion 10 when the security box is in the closed configuration. This minimizes vibration in the security box, and also minimizes tension on the wing where it engages with the blocking members 28 and hence reduces tension on the lock. The use of the nipple 37 and of the spring clamp 43 also allows the security box to be held shut even when unlocked, which reduces clearance of a container door to which the security box is attached and allows the container door to be more easily held open against another wall, such as the side of a transport truck or of a shipping container. Alternatively, other means of holding the security box in the closed configuration when the security box is unlocked could be used, such as magnets. As yet another alternative, nothing could be used to hold the security box closed. However, for the reasons given above this is less than desirable.

All parts of the back portion 10 are preferably integrally formed. Apart from the wing 34, the shaft 38, and the knob 40, all parts of the front portion are preferably integrally formed. All parts of the security box are preferably made of stainless steel so that the security box cannot be easily broken into or opened when in a closed position and locked.

Figure 3:
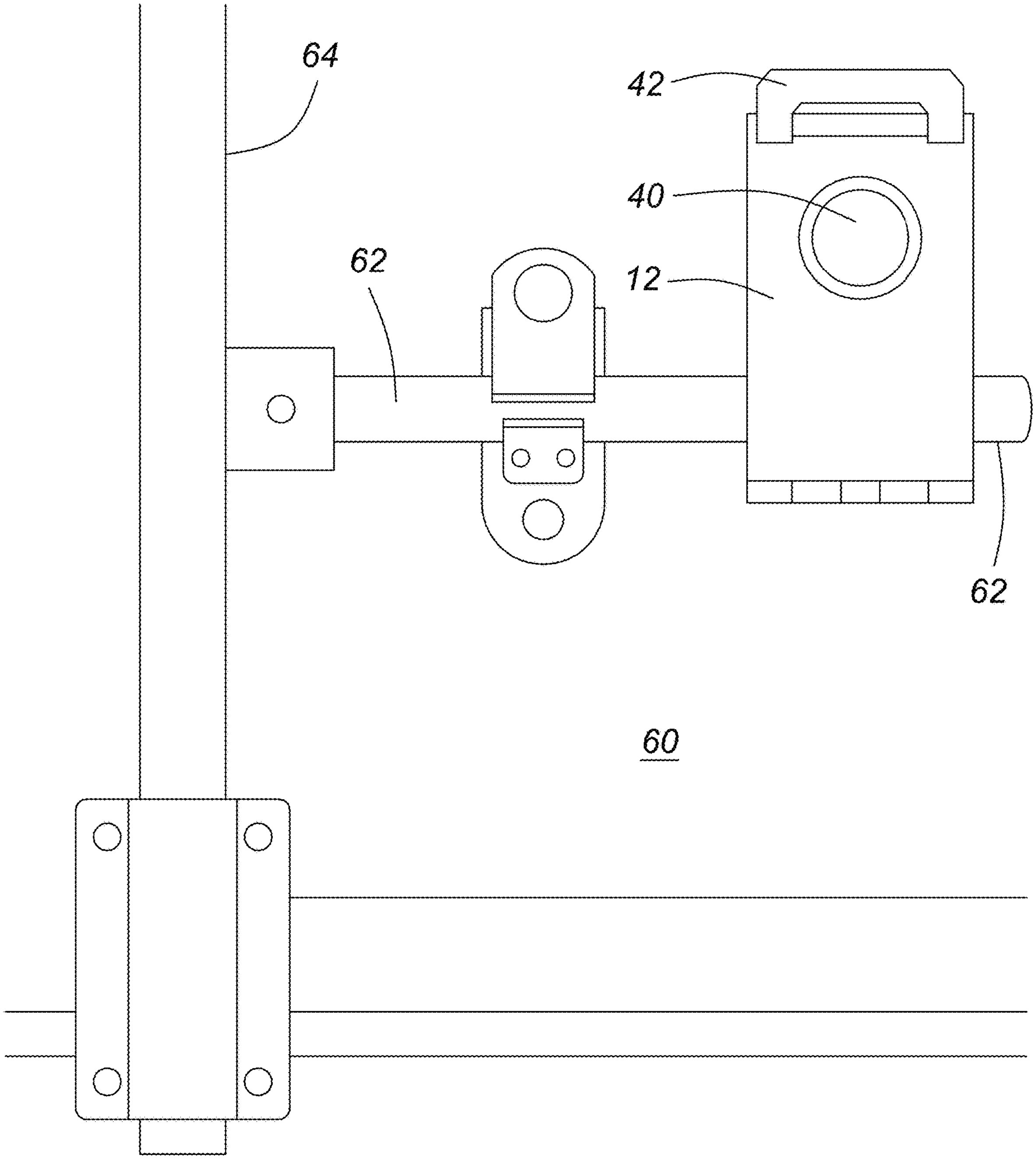
FIG. 3 shows the security box of FIG. 1 in a closed and locked configuration when in place upon a container door.

Referring to FIG. 3, the security box is shown in place on the door of a container in the closed and locked configuration. The security box is affixed to a door 60 of a container used to store and transfer goods, either a fixed container such as that on a tractor-trailer or a non-fixed container such as a shipping container. The container has two side-by-side doors which provide access to the container when either or both doors are opened. The doors of the container each have at least one lockrod assembly 64 which can be rotated axially. Each lockrod assembly 64 is rotated by means of respective handle 62 which can be rotated toward and away from the door 60. When a handle is rotated towards the door, the ends of the lockrod assembly engage with members at the top and bottom of the container to prevent opening of the container door. When the handle is rotated away from the door, the lockrod assembly rod is rotated and the ends of the lockrod assembly no longer engage with the members, and the container door can be opened.

The back wall 16 of the security box of the invention is securely affixed to a face of one of the doors. When the doors of the container are closed, the handles of the lockrod assemblies are rotated towards the container doors so as to engage the cams with the keepers. When the handles are rotated against the doors of the container, the security box is in the open configuration and one of handles 62 is placed so as to lie within the openings 26 in the back portion sidewalls 18 of the security box. The security box is then placed in the closed configuration by swinging the front portion 12 towards the back portion 10. The openings 26 in the sidewalls 30 of the front portion do not interfere with the handle. The security box is then locked using a fob or a cellphone, depending on the electromechanical lock used. In one embodiment, locking of the security box is logged remotely.

The handle cannot be moved when lying within the openings 26 and the security box is in the closed and locked configuration, and hence the container cannot be accessed. The container can only be accessed by unlocking and opening the security box, which the allows the handle to be rotated away from the container door. Unlocking the box requires use of a fob or cellphone. In one embodiment, unlocking and locking of the security box is logged remotely. The information logged may include any or all of: whether the security box is locked or unlocked; the date and time of the change of state of the lock to locked or unlocked; the identity of the container to which the security box is affixed; and an identity of the device used to effect the change of state of the lock.

As stated above, the state of the electromechanical lock can only be changed by use of a fob or by a cellphone containing an app. This allows the security box to be locked or unlocked only electronically, and hence allows access to the container only electronically. This allows an owner of the container full control over access to the container, by for example providing a digital key to the cell phone of a driver or to a customs officer. The digital key cannot be shared by the driver with others, and can be revoked at the owner's discretion. If a fob is used to change the state of the electromechanical lock, the fob is provided to the driver but the digital key contained within the fob cannot be shared easily.

By integrating a digitally controlled electromechanical lock in a hinged steel box that can prevent full movement of a container door handle, greater security of access to the container is provided. In addition, electronically controlled access to the container allows a digital log of access to and locking of the container.

The security box is secured to a container door preferably by carriage bolts passing through the bolt apertures 29 and the container door. Alternatively, other means of securing the security box to a container may be used, such as use of a strong adhesive.

The invention has been described as having two blocking flanges that are arranged in line between the side walls of the back portion, each of which blocks one end of a wing that can be rotated by unlocking an electromechanical lock that locks a rotatable shaft in place. Alternatively, other arrangements of the blocking flanges and the wing could be used. For example, the blocking flanges could be placed with one end attached to the respective side wall and the blocking flanges aligned entirely parallel to the back wall. As another alternative, a single blocking flange could be used, with a rotatable irregularly shaped plate being shaped so as to be blocked by the blocking flange when in one position and to be able to pass the blocking flange freely when rotated into another position. Most generally, the security box comprises at least one blocking flange and a blockable flange which can be rotated into and out of a blockable position by means of the shaft.

The invention has been described as using an electromechanical lock to secure the shaft 38, in one embodiment using the battery free electromechanical cam lock for the iLOQ S50™ locking system. Other electromechanical locks could be used and till provide advantages in securing access to the container, but the type the information available may or may not be limited. In yet another alternative, a purely mechanical lock can be used with a mechanical key. In such an embodiment, secure access to the container is improved, but logging of access is not possible.

The embodiments presented are exemplary only and persons skilled in the art would appreciate that variations to the embodiments described above may be made without departing from the spirit of the invention. The scope of the invention is solely defined by the appended claims.

We claim:

1. A security box for securing a container, comprising:

a back portion comprising sidewalls having openings, a back wall, and at least one blocking flange, the back portion generally shaped as a box open on one face opposite the back wall;

a front portion comprising a front wall, a shaft passing through the front wall, and sidewalls having openings, the front portion generally shaped as a box open on one face opposite the front wall;

a hinge connecting the back wall of the back portion to the front wall of the front portion;

the openings in the sidewalls of the back portion and the openings in the sidewalls of the front portion being positioned such that when the front portion is swung about the hinge towards the back portion to place the security box in a closed configuration, a generally closed box is formed but with openings at the sides, all openings being sized to accommodate a handle of a lockrod assembly of a container door;

a lock within the front portion preventing the shaft from rotating when in a locked configuration; and a blockable member attached to the shaft and which is rotatable parallel to the front wall of the front portion, and rotatable so as to be placed between the at least one blocking flange and the back wall when the shaft is rotated and the security box is in the closed configuration.

2. The security box of claim 1 wherein:

the blockable member comprises a wing parallel to a front wall of the front portion; and the at least one blocking flange comprises two L-shaped flanges, each adjacent a respective one of the sidewalls of the back portion, one leg of each L-shaped flange being in a plane parallel to the back wall and pointing away from the respective sidewall of the back portion;

wherein rotation of the shaft rotates the wing such that ends of the wing are blocked by the two L-shaped flanges when the security box is in the closed configuration.

3. The security box of claim 1 wherein the lock is an electromechanical lock.

4. The security box of claim 1 further comprising:

a nipple on the front portion at an end away from the hinge; and a spring clamp on the back portion at an end away from the hinge;

wherein the nipple engages with the spring clamp when the security box is in the closed configuration.

5. A method of controlling access to a container, comprising:

accessing the container by:

unlocking and opening a security box affixed to a door of the container, the security box being as defined in claim 1; and removing a handle of a lockrod assembly of the door of the container from the openings of the security box by pulling the handle away from the container door; and closing and securing the container by:

closing the door of the container;

rotating the handle towards the door of the container so as to place the handle so as to lie within the openings of the back portion of the security box; and closing and locking the security box while the handle is lying within the openings.

6. The method of claim 5 further wherein the lock is an electromechanical lock, and the security box is locked by use of a digital key which locks the electromechanical lock.

7. The method of claim 6 further comprising logging times of locking and unlocking the electromechanical lock.

8. The method of claim 7 further comprising logging an identity of a device used to lock or unlock the electromechanical lock when the electromechanical lock is locked or unlocked.

* * * * *